United States Patent [19]

Cogliano et al.

[11] Patent Number: 5,120,574
[45] Date of Patent: Jun. 9, 1992

[54] CONCRETE PRIMER FOR POLYESTER COATINGS

[75] Inventors: Joseph A. Cogliano, Pasadena; James M. Gaidis, Ellicott City, both of Md.

[73] Assignee: W.R. Grace & Co.-Conn., New York, N.Y.

[21] Appl. No.: 661,364

[22] Filed: Feb. 27, 1991

[51] Int. Cl.$^5$ .............................................. B05C 1/16
[52] U.S. Cl. ................................. 427/136; 427/140; 427/299; 427/403; 427/407.1
[58] Field of Search ............... 427/136, 403, 299, 333, 427/140, 302, 407.1

[56] References Cited

U.S. PATENT DOCUMENTS

| | | | |
|---|---|---|---|
| 3,008,387 | 11/1961 | Wittenwyler et al. | 427/136 |
| 3,089,784 | 5/1963 | Dowling | 427/333 |
| 3,194,679 | 7/1965 | Dowling | 427/333 |
| 3,325,304 | 6/1967 | Hauck | 427/333 |
| 4,154,774 | 5/1979 | Hinterwaldner | 428/480 |
| 4,440,413 | 8/1983 | Emmons et al. | 427/136 |
| 4,460,625 | 7/1984 | Emmons et al. | 427/136 |
| 4,721,757 | 1/1988 | Schindler | 525/245 |
| 4,874,675 | 10/1989 | Ceska | 427/136 |

Primary Examiner—Michael Lusignan
Assistant Examiner—Diana L. Dudash
Attorney, Agent, or Firm—Howard J. Troffkin

[57] ABSTRACT

A process for applying and providing an enhanced polyester-based polymer concrete overlay on a porous substrate structure is provided. The process requires first applying a monomeric high-molecular weight acrylate- or methacrylate-based pretreatment composition to the substrate and then forming the polyester-based polymer concrete overlay over the treated substrate.

9 Claims, No Drawings

CONCRETE PRIMER FOR POLYESTER COATINGS

BACKGROUND OF THE INVENTION

The present invention is directed to a process of enhancing the bonding of polyester-based polymer concrete overlay to substrates to provide an improved overlay structure.

Polymer concrete compositions have been developed as surface materials to repair and renew pavements, bridge decks, parking decks, as well as warehouse and factory floors and the like. Such materials are also useful in enhancing the structure's surface by making it resistant to intrusion of water, petroleum products and other chemicals. Unlike conventional portland cement compositions, in polymer concretes the aggregate is held together by a polymer matrix.

Polymer concrete compositions are composed of aggregate mixed with a liquid organic compound (monomer) capable of forming a polymeric material upon casting at the jobsite. The composition may contain additional components, such as preformed polymeric material, colorants, shrink control agents, modifiers and the like. Two commonly used polymer concretes are acrylic concretes based on polymethylmethacrylate and the like and polyester concretes based on grafted polyesters.

Because of the relatively high cost of polymer concrete compositions, they are not a replacement for portland concrete. Instead, they are normally used as an overlay to repair and/or enhance conventional portland cement based concrete structures. Polymer concretes, because they do not contain or develop excessive amounts of water during cure, have few voids and, thereby, provide a dense impermeable overlay. The polymers used are required to be highly resistant to chemical attack such as acids, bases, oils, detergents and fats.

Polymer concrete overlays are normally from about 0.25 to 2 inches thick. Due to their hydrophobic nature, they do not form a strong bond with concrete substructures, especially if the substructure is damp or wet. To enhance the bond between the substrate and the overlay, a primer coating is conventionally applied to the substrate prior to application of the overlay polymer concrete composition. Conventionally, the primer is of a substantially similar composition to that of the overlay so as to be compatible with the overlay and capable of having the overlay at least partially dissolve the primer, thereby enhancing adhesion. For example, acrylic based primers are conventionally used with acrylate and methacrylate polymer concretes. Urethane and styrene based primers are conventionally used with styrene-grafted polyester polymer concrete compositions.

In contrast to polymer concrete compositions, high molecular weight methacrylate monomer compositions without aggregate or with very fine aggregate have been introduced as a means of densifying concrete structures. These aggregate-free compositions are applied to concretes and allowed to penetrate and fully polymerize within the voids and cracks of the concrete to provide a denser, more coherent concrete structure. Such compositions must contain oxygen deactivators (driers), polymerization catalysts and accelerators to assure complete curing of the applied composition.

Polyester polymer concrete compositions have not been looked upon favorably, especially for inside application because the primer compositions utilize organic materials of low flash point producing vapors which are disagreeable and sometimes toxic. In addition, the conventional primers for polyester polymer concretes are not effective when applied to damp or wet concrete substrates. Finally, conventional primers are effective only if the polymer concrete is applied immediately after application of the primer which is often difficult to do in field applications.

A method is desired which can enhance the use of polyester-based concrete overlay compositions by providing for damp and wet substrate application, long effective time between primer and polymer concrete application, enhanced bond strength between polyester concrete overlay and substrate and which does not produce noxious or toxic vapors.

SUMMARY OF THE INVENTION

The present invention is directed to a method of enhancing polyester-based concrete overlays by first applying a pretreatment composition formed from a mixture of monomeric high molecular weight acrylate or methacrylate, an organic peroxide which is miscible in the monomeric compound and an aromatic amine, applying the mixture to a substrate structure and subsequently applying a polyester-based polymer concrete overlay to said substrate.

DETAILED DESCRIPTION

The present invention is directed to a method of enhancing polyester-based polymer concrete overlays by having the overlay applied over a previously treated substrate structure. The first treatment involves the application to the substrate of a liquid composition composed of high molecular weight acrylate or methacrylate monomeric compound having therein a miscible $C_3$–$C_{18}$ organic peroxide and an aromatic amine compound.

The present method has been found to provide a means of causing good bonding and overlay structure formation of polyester-based concrete overlays when applied to damp or wet substructure, as is commonly found in the field applications, especially exterior application. Further, the presently described pretreatment provides a means of enhancing bonding between substrate and overlay, extending the time of the primer composition usefulness prior to overlay application and enhancing the resultant overlay structure. Finally, the present method provides the desired enhanced bonding and strength of the overlay without causing the emission of noxious or toxic vapors.

The substructure to which the overlay is applied can be any porous material such as wood, ceramic, or hydraulic cement-based compositions such as pastes, mortars, or concrete. In the majority of instances the substrate is composed of a hydraulic cement-based composition, especially concrete.

The following terms used throughout the instant application and appended claims are defined herein below:

The term "hydraulic cement-based compositions" refer to compositions capable of setting to a solid mass by the reaction of its inorganic binding component with water. The inorganic binder is normally a portland cement or other known hydraulic cement. The binder can also contain fine aggregate (e.g. sand) or mixtures of fine aggregate and coarse aggregate to provide compositions known as mortar and concrete, respectively.

The term "concrete" refers to a class of hydraulic cement-based composition which is generally formed from a hydraulic cement, sand, large aggregate (e.g. about 0.2 to 1 inch dia.) and water. The resultant set or hardened material is a conventional structural material used to form buildings, roadways, bridges and the like. This term shall herein be distinguished from the term "polymer concrete" used in this application and appended claims.

The term "polymer concrete" refers to a material which does not contain portland cement as its primary binder and does not rely upon curing to a solid due to an interaction of water with the binder. Instead, polymer concretes are composed of an organic polymer which holds together the aggregate (e.g. sand, large aggregate) to form a unitary solid structure. Polymer concretes are generally classified according to the polymeric component acting as the binder, as for example, acrylic concrete or polyester concrete. Acrylic concretes are formed from acrylic or methacrylic acid ester (e.g. methyl methacrylate) monomers which are mixed with aggregate, placed in a form and shape desired and caused to cure by polymerization of the monomeric units. The resultant polymer binder has essentially a hydrocarbon polymer backbone with pendent carboxylic acid ester groups. In contrast, a "polyester concrete" is formed from a mixture of a preformed unsaturated polyester (normally of low molecular weight) which was formed by a condensation reaction between compounds having at least two carboxylic acid groups and compounds having at least two hydroxy groups or their equivalence. The polyester polymer has a chemical structure in which the ester groups are part of the backbone of the polymer chain and which further has some olefinic unsaturation, normally within the backbone chain. This polyester prepolymer is mixed with a vinyl monomer, such as styrene, and with aggregate. The mixture is placed in a form and shape desired and caused to cure by polymerization of the monomeric component which becomes grafted onto and/or crosslinked with the polyester.

The term polymer concrete should not be confused with latex-modified concretes which are compositions made by incorporating polymer into fresh, unset hydraulic cement-based concrete composition.

The present invention is directed to an improved method of applying a polyester concrete overlay to a porous substrate structure.

The present invention requires first applying a liquid composition, as fully described below, onto the substrate surface and then applying the polyester-based polymer concrete as an overlay coating thereon. The initially applied liquid composition is an essentially anhydrous (may have up to about 1 percent by weight of water in the composition) mixture of:

a) at least one high molecular weight (i.e. $C_{10}$–$C_{30}$) ester of methacrylic acid or acrylic acid;

b) from about 0.1 to about 4 percent by weight, based on the weight of monomer, of a $C_3$–$C_{20}$ hydrocarbyl peroxide; and c) from about 0.to about 5 percent by weight based on the weight of monomer, of an aromatic amine.

The monomeric compounds useful herein are high molecular weight esters of $\beta$-unsaturated monocarboxylic acid selected from acrylic acid and methacrylic acid such as, isodecyl methacrylate, cetyl methacrylate, lauryl methacrylate, eicosyl methacrylate, stearyl methacrylate, as well as dicyclopentenyl, dicyclopentenylalkyl or dicyclopentenyloxyalkyl esters of methacrylic acid or acrylic acid represented by the formula

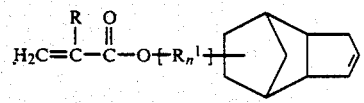

wherein R is $CH_3$ or H, n is 0 or 1, and $R^1$ is selected from (i) a $C_2$–$C_6$ alkylene group; or (ii) a $C_2$–$C_6$ oxyalkylene (—R″—O—) wherein R″ is equivalent to R′; or (iii) a $C_4$–$C_6$ oxyalkylene [R‴—O—] wherein R‴ represents a polyoxylalkylene group in which each alkylene segment has at least 2 carbon atoms and the alkylene segments are joined by an oxygen atom.

The dicyclopentenyloxyalkyl esters can be formed according to the method disclosed in U.S. Pat. No. 4,097,677. Examples of such higher molecular weight ester compounds are dicyclopentenyloxyethyl methacrylate, dicyclopentenyloxyisopropyl methacrylate, dicyclopentenyloxyisopropyl acrylate, and dicyclopentenyloxyneopentyl methacrylate. Dicyclopentenyloxyethyl methacrylate is most preferred.

The dicylopentenyl and dicyclopentenylalkyl esters of acrylic and methacrylic acids are prepared by hydrating dicyclopentadiene or alkyldicyclopentadiene and subsequently esterifying with the free acid or transesterifying with an alkyl acrylate or methacrylate in manners known in the art.

The high molecular weight ester may, in addition, contain small amounts (up to about 15 wt. percent, preferably up to about 10 wt. percent based on the weight of high molecular weight ester) of an unsubstituted or substituted $C_1$–$C_6$ aliphatic hydrocarbon ester of a monocarboxylic acid selected from acrylic acid or methacrylic acid. The substituted group of the ester can be halo, hydroxy or the like.

The present pretreatment composition further requires a free radical polymerization catalyst which is miscible with the acrylate or methacrylate in the amount used. The catalyst is preferably selected from hydrocarbon peroxides and hydroperoxides having $C_3$–$C_{18}$ carbon atoms. These materials should be completely soluble in the monomeric component in the amounts utilized. Suitable organic hydroperoxides include tertiary-butylhydroperoxide, cumene hydroperoxide, methyl ethyl ketone hydroperoxide and diisopropylbenzene hydroperoxide. Suitable peroxides include benzoyl peroxide, tert-butylperbenzoate, 2,2-bis-(tert-butylperoxy)-butane, bis-(1-hydroxy-cyclohexyl)peroxide, and tertbutylperoxy-isopropyl carbonate and the like. The catalyst should be added in from 0.1 to 4 percent by weight based on the weight of the monomer used. These materials can be introduced with some inert solid or liquid diluent which is miscible with the monomer, or can be introduced with the aromatic amine or neat. It is preferred to introduce the catalyst into the monomer component with a diluent to aid in providing for better dosage measurement and ease of uniform distribution.

In addition to the catalyst agent as described above, the pretreatment composition preferably contains an aromatic amine to enhance the rate of polymerization caused by the catalyst. Examples of useful aromatic amines include aniline, N,N-dimethylaniline, N,N-diethylaniline, toluidine, N,N-dimethyl p-toluidine, N,N-di(hydroxyethyl)toluidine, and p-dimethylaminobenzaldehyde and the like. These may be added for this purpose in an amount of up to 5 percent, preferably from about 0.01 to 5 percent (preferably 0.1 to 5 percent) by weight of the monomer component.

The liquid pretreatment composition of the present invention may contain minor amounts of additives such as coloring agents, texturing agents, inhibitors, stabilizers, antioxidants, thickeners, rheology modifiers, preservatives (e.g. for wood and other materials subject to biological or environmental degradation) and the like. In addition, it may contain small amounts (less than 20 wt. percent, preferably less than 10 wt. percent) of very fine solid particulate material as extender material. Unlike conventional polymer concrete compositions and the like where the particulate is used in a range of particle size to enhance strength, in the present composition the solid particulate is merely added for economic purposes as an extender and/or a thickener. In the present composition, any solid particulate material used must be limited to material which is inert with respect to the other components of the pretreatment composition and of the overlay composition, of ultra-small particle size (up to about 50 microns) so as not to impede penetration of the pretreatment composition into the substrate pores and not to cause puddling or coating of the composition on the substrate surface.

The present pretreatment composition should be substantially free of metal salts and complex as well as other materials known in the art as "siccatives" or "driers". Such materials are well known in the art and generally are composed of polyvalent metal salts and complexes, as, for example, polyvalent metal salts of calcium, copper, zinc, manganese, lead, cobalt, iron, vanadium, and zirconium where the anion is from a higher (e.g. $C_8$–$C_{30}$) aliphatic acid or naphthenic acid. In certain instances (e.g. where heavy application is made), these materials may be present in the pretreatment composition in very small amounts of less than about 0.01%, preferably less than about 0.002%. The most preferred compositions are free of these materials or contains them in amounts which do not provide a fully dried (tack-free) composition, when applied to the substrate.

The components of the pretreatment composition are normally mixed at the job site shortly before application. That is, the peroxide or hydroperoxide is introduced into the monomer component prior to application. Normally, other components of the composition, such as aromatic amine and the like can be previously mixed with the monomer and shipped to the job site. Alternatively, the peroxide and amine, as one package, can be mixed with the monomer at the job site. It is sometimes convenient to add a coloring agent to the catalyst package so that one can visually observe the uniformity of the mix.

Once mixed, the present pretreatment composition can be applied to the surface to which a polyester polymer concrete overlay will be applied at a later time. Application of the pretreatment composition can be done in any conventional manner such as by brushing, spraying, roller applicator or the like. The liquid pretreatment composition should not be allowed to pond, agglomerate or the like on the surface but, instead, should be applied evenly over the surface to penetrate while leaving only residual amount at the surface of the substrate material. Normal coverage is from about 10 to 150, preferably 10-50 g/m² of substrate surface.

The present invention contemplates a means of improving substrate surfaces which are in disrepair or require enhancement of wear and/or chemical resistance. The substrate may be formed from a number of substances such as plaster, cement, mortar, concrete, stone, terrazzo, clay brick and the like. The most applicable are concrete floors and surfaces which are in disrepair. The substrate may be in a wet or dry state when the pretreatment composition is applied. The present method thereby provides a means of applying an overlay to substrates which are exposed to the environment and where maintenance of a dry state is not controllable.

The polyester-based polymer concrete can be formed on the previously treated substrate after application of the pretreatment composition. Application can be done over an extended time after pretreatment composition is applied, preferably up to about 4 days and most preferably up to about 2 days after pretreatment is done. This extended time permits greater work scheduling flexibility then normally obtained with conventional primers for polyester-based polymer concrete overlay. The overlay is applied in the conventional manner. This normally requires mixing a catalyst-containing component with the monomer-containing component to form a mixture of polyester, monomer, aggregate, catalyst, driers and other components of such polymer concrete composition, and subsequently applying the mixture onto the pretreated substrate in from about 0.25 to 2 inches thickness and allowing it to cure into a monolithic topping having enhanced bonding to the substrate structure.

The following examples are given for illustrative purposes only and are not meant to be a limitation on the present invention, as defined by the appended claims. All parts and percentages are by weight unless otherwise specified.

EXAMPLE 1

To a mixture of 3.5 parts of diethylaniline in 10,000 parts of dicyclopentenyloxyethoxymethacrylate (Rohm & Haas 1540 Methacrylate) was added 289 parts of a dry mixture of benzoyl peroxide with an inert ultrafine particulate in a 1:1 ratio. The resultant material was mixed for several minutes to assure a uniform mix of the benzoyl peroxide in the methacrylate.

A concrete sample with a 28 day compressive strength of over 7500 psi was prepared in a conventional manner (ASTM C136) by mixing 47.9 parts Portland cement (Type III), 35 parts fine sand, (4–200 US Std. mesh), 35 parts limestone powder (smaller than 200 mesh), 51.4 parts coarse sand (⅜ in–6 mesh) and 95.9 parts aggregate (¾–1½ in) with 23 parts water and introducing the mixture into 15"×4"×16" molds and allowed to cure for 28 days. The resultant concrete was sawed using a masonry saw into 16"×4"×1.25" slabs with the sawed surfaces cleaned to remove any dust material. Each sample was then cut into two 8"×4"×1.25" concrete sample slabs for testing purposes.

Each concrete sample slab was conditioned in the following manner. Samples representing dry application were each initially soaked in water for 24 hours and then removed from the water and allowed to dry for a period of 7 days at 20° C. and under a relative humidity of 20–30%. The surface to be treated was brushed with a soft brush to remove any dust or other extraneous matter prior to application of the pretreatment composition.

The formed pretreatment mixture was applied by brush to one of the major sawed surface of each concrete sample slab used in the test. The pretreatment mixture was applied to each surface within fifteen minutes of formation in a uniform manner and at a ratio of 30 g/m$^2$ of concrete surface.

Pretreatment Aging

A series of samples were prepared in the manner described above to provide pretreatment concrete samples for application of a polyester polymer concrete overlay material. Each pretreated concrete sample was covered along one edge with ¾ in. wide tape to assure non-along adherence of the overlay to the concrete at the edge portion. A two-component polyester-based polymer concrete composition (Syncrete sold by W.R. Grace & Co.) was formed by mixing the liquid component (unsaturated polyester resin dissolved in styrene monomer, water and amine catalyst accelerator) with the solid component (sand, portland cement, peroxide catalyst) into a uniform mixture which was applied to the concrete sample blocks over the entire pretreated surface to a thickness of 0.5 inch. The polyester overlay was applied to four blocks after 2 hours, 4 hours, 24 hours and 48 hours from the time of application of the pretreatment composition. After complete curing of the polyester overlay, each block was cut into three test samples of 2"×4"×1.25" with the tape portion along the 2" edge and then removing the ¾ inch tape-concrete block portion was removed. The resultant exposed overlay was subjected to tensile test to determine the force required to delaminate the overlay from the block. The Table I below provides the tensile test results of the samples based on extent of time prior to overlay application. It is clear that the present pretreatment primer provided a high degree of adhesion irrespective of time.

For comparative purposes, the above test was repeated except that a conventional polyurethane-based pretreatment composition was applied (Terostat 153; an isocyanate-terminated polyurethane prepolymer in xylene and toluene) to concrete block samples instead of the present methacrylate pretreatment composition. The samples were tested to determine the force required to delaminate the polyester overlay from the block. These results are given for comparative purposes in Table I below and show that, unlike the present priming method, the conventional application of polyester is time-sensitive when using known primer material.

TABLE I

| | Delamination Force[1] | | | |
|---|---|---|---|---|
| | Time Lapse Between Primer and Overlay application | | | |
| Primer | 2 hrs. | 6 hrs. | 24 hrs. | 48 hrs. |
| Methacrylate | 41.2 | 41.6 | 40.00 | 40.2 |
| Polyurethane | 39.9 | 31.6 | 13.9 | 18.9 |

[1]Force given in kg/2" width

EXAMPLE II

Samples were formed in the same manner as described in Example 1 above except that the high molecular weight methacrylate pretreatment composition of the present invention was applied in dosages of 30 g/m$^2$; 90 g/m$^2$; and 150 g/m$^2$ and allowed to remain on the concrete block for two hours prior to overlay application. The delamination force required was substantially the same (40.7±2.4 kg/2" width) for all samples showing that the present pretreatment is insensitive to dosage applied.

EXAMPLE III

Samples were formed in the same manner as described in Example II above with various dosage loading of pretreatment composition. No tape edge was formed or removed but, instead two inch diameter samples were formed by cutting with a 2" hole saw through the overlay and into the concrete. To each 2 inch overlay sample was epoxy-glued a stainless steel rod.

Adhesion of the overlay to the pretreated concrete was tested by performing a tensile test using an Instron Tensile Machine at 0.2 in./min. The results are given in Table II below and show that the adhesion was substantially the same for all dosages (if anything, it was higher at low dosages).

For comparison, concrete samples formed in the same manner except primed with Terostat 153 were tested and the results are also given in Table II below. Here the adhesion is lower especially at the lower dosage of 30 g/m$^2$ showing that the present primer can be used in a more cost-effective manner.

TABLE II

| | Adhesion Test[1] | | |
|---|---|---|---|
| | Force for various Primer Loadings | | |
| Primer | 30 g/m$^2$ | 90 g/m$^2$ | 150 g/m$^2$ |
| Present Primer | 3.10 | 2.78 | 3.03 |
| Conventional PU Primer | 2.35 | 2.67 | 3.25 |

[1]Tensile Force in MPa

EXAMPLE IV

Concrete substructure samples were formed in the manner described in Example I above. The sample slabs were submerged in water for twenty-four hours and then removed from the water fifteen (15) minutes prior to application of primer and overlay. Upon removal from water, the samples were maintained at 20° C. and 20–30% relative humidity with a damp cloth maintained over the surface subsequently treated. Five samples were treated with the present high molecular weight methacrylate-based pretreatment composition, another five with Terostat 153 polyurethane primer composition and a third group of five were not primed (herein called "blanks"). After two hours (for primed samples) a polyester-based overlay (Syncrete) of 0.5 in. thickness was formed on each concrete sample. The samples were then subjected to temperature cycling of from −5° to +50° and back to −5° C. over 6 hour period. This cycling was repeated and delamination at corners and edges of each sample was observed as shown in Table III below. Each corner and each edge delamination counted as one (1) and, therefore each sample could provide scores of from 0 to 8. The scores show that the present method provided the least delamination.

TABLE III

| | Number of Cycles | | | |
|---|---|---|---|---|
| Samples | 3 | 8 | 12 | 24 |
| Blank | 0/0/0/6/8 | 0/0/1/7/8 | 0/1/1/7/8 | 1/1/3/7/8 |
| Polyurethane | all 0 | 0/0/0/1/3 | 0/0/0/1/3 | 0/1/1/3/3 |

TABLE III-continued

| Samples | Number of Cycles | | | |
|---|---|---|---|---|
| | 3 | 8 | 12 | 24 |
| Methacrylate | all 0 | 0/0/0/0/1 | 0/0/0/0/1 | 0/0/0/0/1 |

We claim:

1. An improved method for applying a polyester-based polymer concrete overlay to a substructure comprising forming an acrylate or methacrylate monomer-based pretreatment composition composed of
   a) at least one monomeric $C_{10}$-$C_{30}$ ester of alpha, beta-unsaturated monocarboxylic acid selected from acrylic acid and methacrylic acid;
   b) from about 0.1 to 4 weight percent based on said monomer (a) of a free radical catalyst; and
   c) from about 0.01 to 5 weight percent based on said monomer (a) of an aromatic amine;
   coating said pretreatment composition on the surface of a substructure; and
   subsequently applying a catalyzed polyester-based polymer concrete overlay to said substructure surface having the previously applied pretreatment composition.

2. The method of claim 1 wherein the free radical catalyst is selected from $C_3$-$C_{20}$ peroxides and hydroperoxides.

3. The method of claim 1 or 2 wherein the ester monomer (a) of the pretreatment composition is selected from acrylic acid and methacrylic acid such as, isodecyl methacrylate, cetyl methacrylate, lauryl methacrylate, eicosyl methacrylate, stearyl methacrylate, as well as dicyclopentenyl, dicyclopentenylalkyl or dicyclopentenyloxyalkyl esters of methacrylic acid or acrylic acid represented by the formula

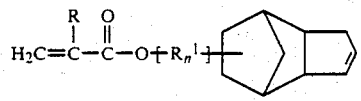

wherein R is $CH_3$ or H, n is 0 or 1, and $R^1$ is selected from (i) a $C_2$-$C_6$ alkylene group; or (ii) a $C_2$-$C_6$ oxyalkylene (—R″—O—) wherein R″ is equivalent to R′; or (iii) a $C_4$-$C_6$ oxyalkylene [R′″—O—] wherein R′″ represents a polyoxyalkylene group in which each alkylene segment has at least 2 carbon atoms and the alkylene segments are joined by an oxygen atom.

4. The method of claim 3 wherein the ester monomer is selected from dicyclopentenyl, dicyclopentenylalkyl, dicyclopentenyloxyalkyl ester of acrylic and methacrylic acid; said alkyl is a $C_2$-$C_6$ alkyl or alkoxyalkyl group.

5. The method of claim 4 wherein the ester monomer is dicyclopentenyloxyethyl methacrylate.

6. The method of claim 3 wherein the free radical catalyst is soluble in the amount used and with respect to the monomer used and is selected from benzoyl peroxide, tert-butylperoxide, 2,2-bis-(tertbutylperoxy)butane, cumene hydroperoxide, methyl ethyl ketone hydroperoxide and diisopropyl benzenehydroperoxide.

7. The method of claim 1 wherein the pretreatment composition contains up to about 15 wt. percent based on said monomer (a) of an unsubstituted or substituted $C_1$-$C_6$ aliphatic hydrocarbon ester of a monocarboxylic acid selected from acrylic acid and methacrylic acid.

8. The method of claim 3 wherein the polyester-based polymer concrete is a two-component system mixed prior to application.

9. The method of claim 8 wherein the two-component polyester-based polymer concrete composition comprises a liquid first component of unsaturated polyester resin, styrene monomer and water and a solid second component comprises sand, portland cement and free radical catalyst.

* * * * *